United States Patent [19]

Matthews

[11] 4,395,376

[45] Jul. 26, 1983

[54] INJECTION MOULDING MACHINES

[75] Inventor: John Matthews, Tadworth, England

[73] Assignee: Crayonne Limited, Middlesex, England

[21] Appl. No.: 288,047

[22] Filed: Jul. 29, 1981

[30] Foreign Application Priority Data

Aug. 12, 1980 [GB] United Kingdom ............................. 8026165

[51] Int. Cl.³ .............................................. B29F 1/02
[52] U.S. Cl. ........................................ 264/73; 264/75;
264/245; 264/328.14; 264/328.18; 425/208;
425/379 R; 425/548; 425/550
[58] Field of Search ............. 264/73, 75, 245, 328.14,
264/328.18; 425/379, 550, 548, 587, 208

[56] References Cited

U.S. PATENT DOCUMENTS

| 2,746,089 | 5/1956 | Hendry | 264/328.14 |
| 3,674,401 | 7/1972 | Annis, Jr. et al. | 425/208 |
| 3,738,420 | 6/1973 | Poux et al. | 165/1 |
| 3,945,786 | 3/1976 | Bishop | 425/550 |
| 4,042,660 | 8/1977 | Bishop | 264/245 |
| 4,183,448 | 1/1980 | Nash | 425/379 R |
| 4,299,792 | 11/1981 | Nunn | 264/73 |
| 4,306,848 | 12/1981 | Nunn | 264/73 |

FOREIGN PATENT DOCUMENTS

| 2351809 | 4/1974 | Fed. Rep. of Germany | 425/379 |
| 2436039 | 2/1976 | Fed. Rep. of Germany | 425/208 |
| 2714509 | 10/1978 | Fed. Rep. of Germany | 264/75 |
| 1280669 | 11/1961 | France | 425/208 |
| 1173547 | 12/1969 | United Kingdom . | |
| 2004804A | 8/1978 | United Kingdom | 264/75 |

Primary Examiner—Jeffery R. Thurlow
Attorney, Agent, or Firm—C. O. Marshall, Jr.

[57] ABSTRACT

An injection moulding machine has a reciprocable and rotatable screw which is water cooled internally. This enables the temperature of the machine to be precisely controlled. This further enables the required plasticization of the resin granules with limited mixing of the same, so that multi-color effects can be achieved. FIG. 5 shows the waterways in the screw and the rotating supply connections.

3 Claims, 5 Drawing Figures

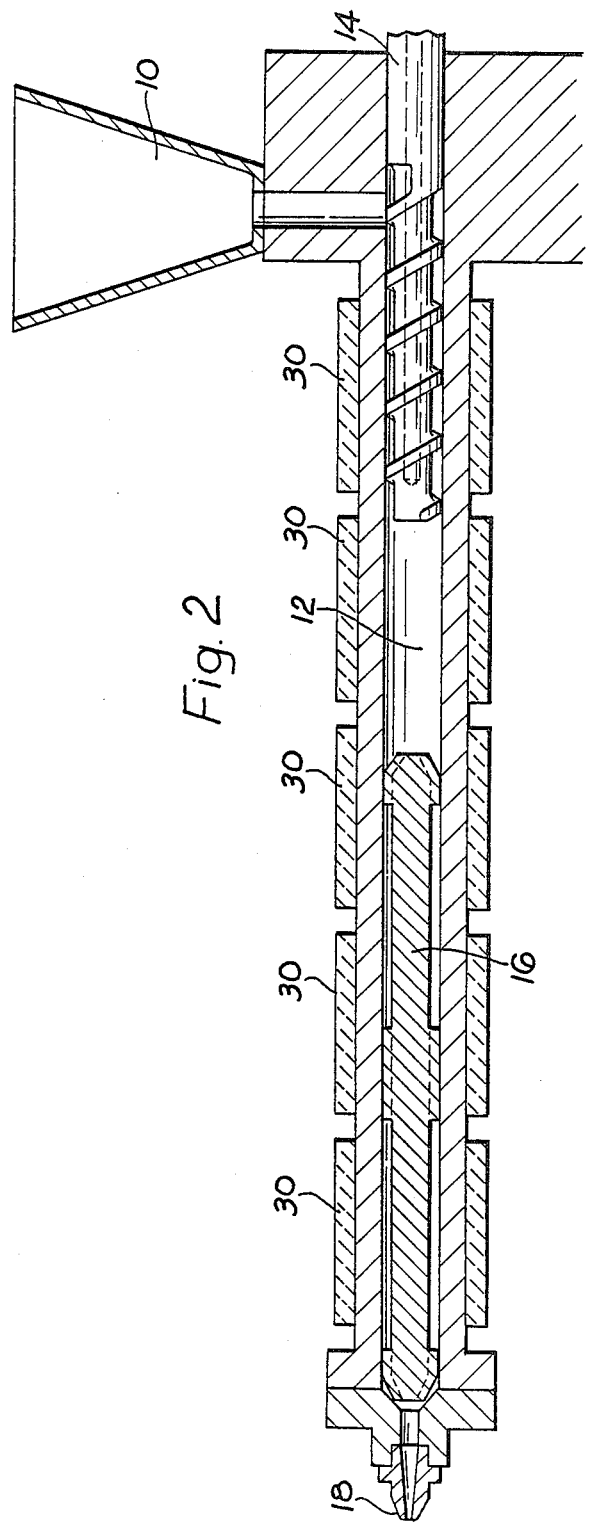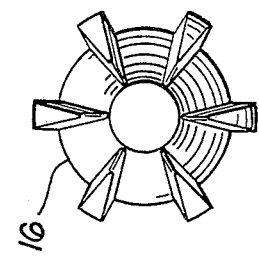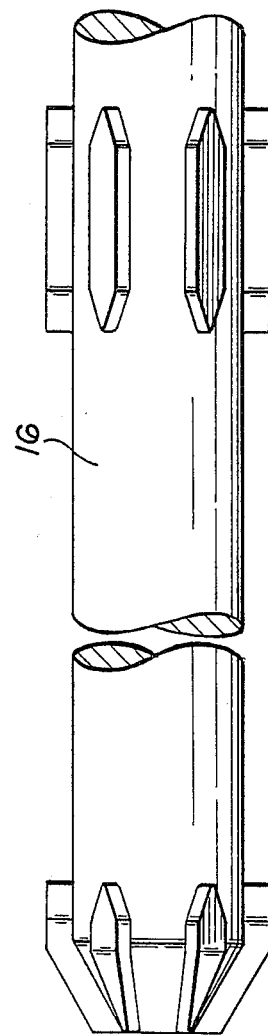

INJECTION MOULDING MACHINES

DESCRIPTION

This invention relates to injection moulding machines for use with synthetic resins. In the early days of injection moulding of thermoplastic materials, ram machines were used in which travel of the ram pushed granules of the resin through a barrel and about a spreader located in the barrel so as to distribute the material in an annular or more complex shape for heating and plasticisation immediately before the injection nozzle. In such machines it was possible to produce coloured effects by mixing granules of two or more colours in the hopper feeding into the barrel and so called tortoiseshell and onyx simulations could be obtained. This is largely because very little mixing took place in the machine. Such machines however have a relatively small capacity and they are unsuitable for complex moulding. Whilst the absence of mixing is an advantage for this specialised requirement of producing onyx effects, it is a disadvantage for most other purposes since the slightest contamination tends to produce a mark or streak in the produced moulding, and for good quality work this means scrap and waste.

Ram machines went out of favour and probably very few if any are still in use. They have largely been replaced by screw-type machines in which the ram is an Archimedian screw usually having a flight which varies at a uniform rate along its (helical) length so that during ordinary rotation of the screw, granules are fed in a somewhat annular shell between the screw and the barrel for plasticisation, and some mixing occurs as a result. Periodically the screw is reciprocated in ram fashion to inject the plasticised material via a nozzle. These screw machines can be used to produce larger and more complex mouldings, and because the plasticisation is more thorough problems from contaminants are minimised. But as a consequence of the mixing there is no possibility of producing onyx and like effects.

It is however known to use modifications for producing onyx and such effects, by providing a plurality of screws and barrels communicating to a common nozzle, but this obviously increases the cost of the machine very substantially. It is also known to provide colourants in the form of liquids which are injected into the plasticised material at approximately the position of the injection into the mould, but these arrangements also have their problems and disadvantages.

In U.K. patent application No. 2004804 we have proposed a compromise machine which uses a reciprocable screw but also has the spreader of the ram-type machine, with heaters for plasticising arranged about a barrel over the spreader zone and elsewhere, but with the barrel cooled over the area occupied by the screw. This has been used successfully to make onyx effects and the like and to some extent has the advantages of both screw and ram machines without involving the attendant expense and complications of the modifications mentioned above. However in certain circumstances it has proved difficult to operate satisfactorily, and the object of the invention is to provide improvements.

In accordance with the invention, an injection moulding machine has a barrel with a spreader and a heater associated with the spreader zone, the barrel housing a reciprocable screw with means for cooling the apparatus in the screw vicinity, characterised in that the cooling means comprise waterways in the screw itself.

The invention also consists in the method of making multi-coloured plastics mouldings including the step of feeding granules by a screw whilst limiting plasticisation by the screw by means of internal watercooling.

By these means the temperature of the machine and hence of the parts can be controlled more precisely and this in turn allows the plasticisation to be more precisely controlled.

The invention is now more particularly described with reference to the accompanying drawings in which:

FIG. 2 is a view similar to FIG. 1 but showing the apparatus of the present invention;

FIG. 3 is an enlarged fragmentary view of the spreader included in the apparatus;

FIG. 4 is an end view of the spreader; and

Figure 1:
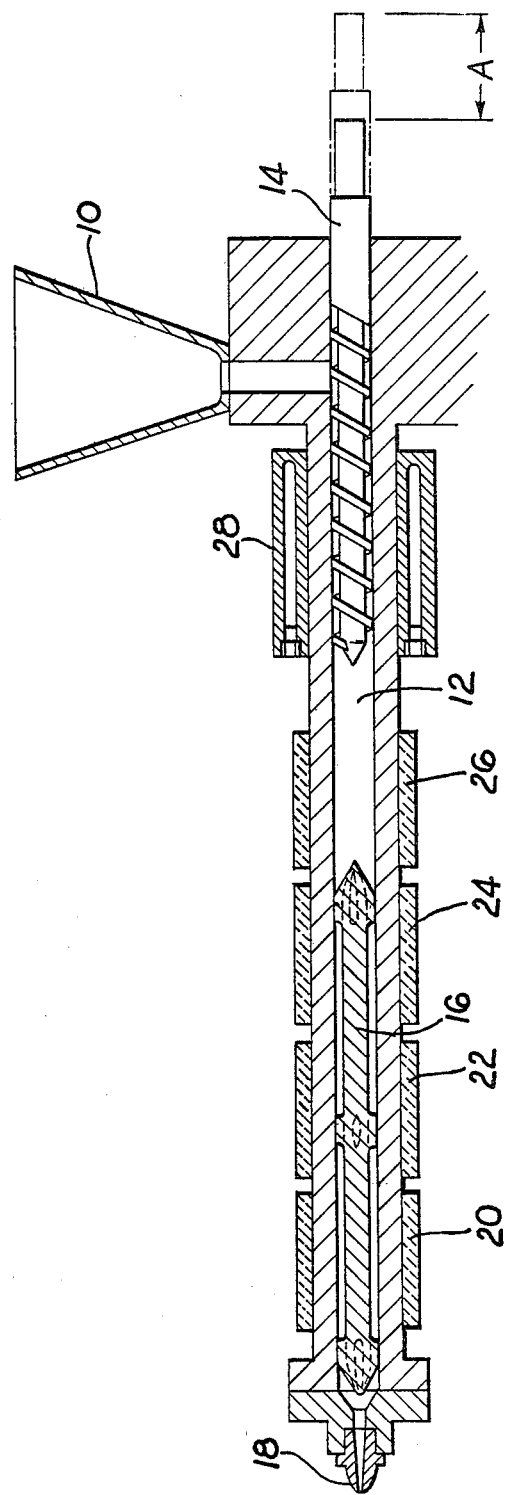
FIG. 1 shows the prior art, in particular the apparatus of said Application No. 2004804.

Referring first to FIG. 1 (prior art) granules are loaded into hopper 10 to feed into barrel 12 which houses a reciprocating and rotary screw 14. The screw is short as compared to the length normally used in a machine of the same capacity, so as to reduce the amount of mixing resulting from the screw action. The barrel houses a spreader 16 located towards the injection nozzle 18 and heaters 20, 22, 24 and 26 are provided located over the space between the axial adjacent ends of the spreader and screw and over the length of the barrel occupied by the spreader, for the purpose of heating and plasticising the material. In order to limit or prevent plasticisation in the region of the screw, a cooler 28 is fitted about the barrel at that point. The screw is reciprocable through the dimension A for injection purposes.

Turning now to the present invention and particularly FIG. 2 thereof, the arrangement shown in FIG. 2 will be seen to be generally similar except that heaters 30 are now fitted along the whole length of the barrel so as to allow plasticisation to occur in the screw vicinity. The spreader is shown in more detail in FIGS. 3 and 4.

Figure 5:
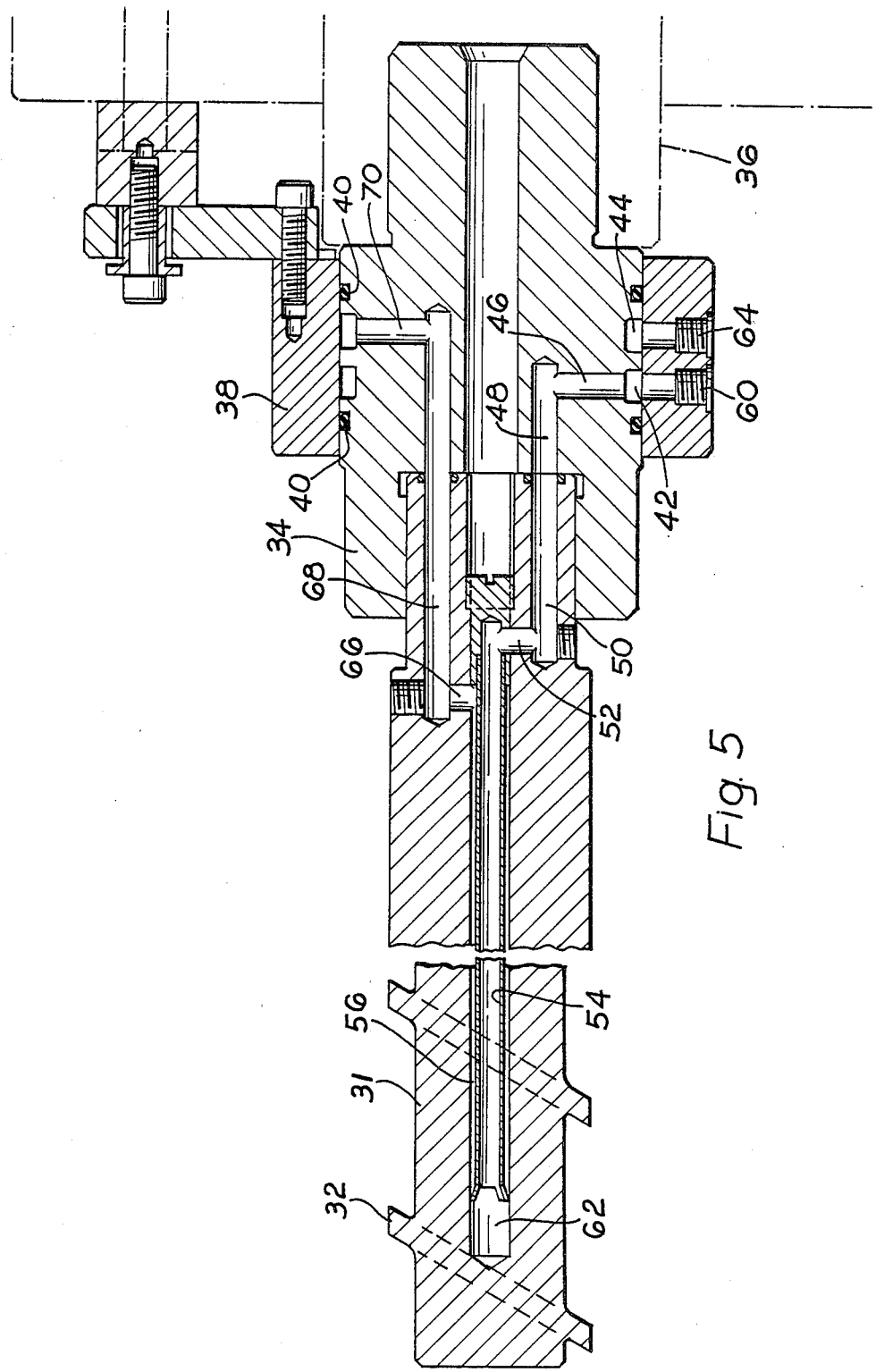
FIG. 5 is an enlarged scale fragmentary and sectional elevation showing the screw used in the present embodiment.

A best seen in FIG. 5, the screw comprises a body 31 formed with a continuous helical flight 32 and the body 31 is anchored to an end part 34 which is rotatable in a housing shown in chain-dot line by the reference 36. The part 34 extends through a stationary gland 38 with "O" ring or like seals 40.

Part 34 has a pair of peripheral grooves 42, 44 which are aligned respectively with a pair of tappings 60, 64 for connection of water supply and return hoses (not shown). Groove 42 communicates via the generally radial passage 46 with a passage 48 parallel to the axis of part 34 and this in turn is connected via passage 50 and further radial passage 52 in the screw body 31 with an axially extending water tube 54. The water tube 54 is concentrically located in a space along the axis of the screw body so as to provide an annular return passage 56 about tube 54. Hence water flows through inlet tapping 60 and then along the interior of the pipe 54 emerging at the end space 62 to flow back externally of the pipe 54 and return to the outlet tapping 64 via a generally similar route involving passages 66, 68 and 70. Hence the screw can be cooled by a flow of coolant e.g. water, whilst rotating and indeed also whilst reciprocating.

It has been found experimentally that the combination of the heater on the barrel surrounding the screw with coolant supplied to the screw enables the temperature of the parts to be controlled very finely and the degree of plasticisation in the screw zone to be very precisely controlled thus enabling onyx and like effects to be produced or not at will. Moreover, in the usage of any conventional injection moulding machine the degree of plasticisation varies during the working shift as heat builds up in the relatively massive metal parts of the machine: whilst this may be unimportant for single colour mouldings it would give rise to problems even with the mentioned prior art ram machines if used for multi-colour effects: with the present invention the temperature can be more precisely controlled to avoid such problems. It is believed that a machine made as shown in FIGS. 2 and 5 possesses all of the advantages of the conventional ram and screw machines and possibly additional advantages in offering more precise control which may be of value even where special coloured effects are not required.

I claim:

1. An injection moulding machine for producing vari-coloured articles, comprising a barrel housing a reciprocable screw, means for heating the barrel to promote the flow of plastic material in contact with the inner surface of the barrel and a spreader fixed in the discharge end of the barrel for conducting heat from the barrel into the material to fuse the material passing through the spreader, the screw having an internal passage for conducting a cooling fluid to inhibit fusing and mixing of vari-coloured material carried between the flights of the screw.

2. An injection moulding machine as claimed in claim 1 wherein the screw comprises a body secured to an end part rotatable in a housing having a stationary gland part, communication for flow of cooling fluid between the rotatable end part and the stationary gland part being provided by two continuous peripheral grooves and two generally radially extending flow passages, each peripheral groove on one of said parts being aligned with a flow passage on the other part.

3. A method of moulding vari-coloured articles in an injection molding machine having a barrel housing a reciprocable screw, comprising the steps of heating the barrel to promote the flow of plastic material in contact with the inner surface of the barrel, cooling the screw internally to inhibit fusing and mixing of vari-coloured material carried between the flights of the screw, and passing the material through a spreader fixed in the discharge end of the barrel to conduct heat from the barrel into the material to fuse the material without mixing it.

* * * * *